(12) United States Patent
Marzen et al.

(10) Patent No.: US 7,435,311 B1
(45) Date of Patent: Oct. 14, 2008

(54) PANEL-TO-PANEL LAMINATION METHOD FOR IMPROVED UNIFORMITY

(75) Inventors: Vincent P. Marzen, Robins, IA (US); Paul R. Nemeth, Cedar Rapids, IA (US); James D. Sampica, Springville, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 620 days.

(21) Appl. No.: 11/215,683

(22) Filed: Aug. 30, 2005

(51) Int. Cl.
*B32B 37/00* (2006.01)

(52) U.S. Cl. .................. 156/286; 156/87; 156/285; 156/295; 156/580

(58) Field of Classification Search .......... 156/60, 156/285, 87, 286, 295, 381, 382, 580, 583.91
See application file for complete search history.

(56) References Cited

U.S. PATENT DOCUMENTS

| | | | | |
|---|---|---|---|---|
| 5,273,553 A | * | 12/1993 | Hoshi et al. | 29/25.01 |
| 5,592,288 A | | 1/1997 | Sampica et al. | 356/62 |
| 5,942,062 A | * | 8/1999 | Hassall et al. | 156/87 |
| 2002/0179229 A1 | * | 12/2002 | Chuzles | 156/205 |

* cited by examiner

*Primary Examiner*—Jeff H Aftergut
(74) *Attorney, Agent, or Firm*—Nathan O. Jensen (57) ABSTRACT

A method of adhering a first panel, such as an OLED assembly, to a second panel, such as a protective cover plate, is disclosed. An adhesive is applied to a face of at least one of the first and second panels. The first panel is positioned to be responsive to movement of any of a plurality of independently controlled expandable elements. The second panel is held adjacent the first panel. At least one of the expandable elements is selectively expanded so that a first edge of the first panel contacts a first edge of the second panel. The expandable elements are further selectively expanded so that the adhesive fully contacts the first and second panels.

20 Claims, 8 Drawing Sheets

PANEL-TO-PANEL LAMINATION METHOD FOR IMPROVED UNIFORMITY

RELATED INVENTIONS

This application is related to the following co-pending U.S. patent applications, all of which are filed on an even date herewith and are incorporated by reference herein in their entirety:

U.S. patent application No. 11/214,547, "OLED Face Seal Incorporating Liquid Adhesive And Cover Glass," Vincent Marzen et al.;

U.S. patent application No. 11/214,518, "Process for Glass-to-Glass Sealing OLEDs With Dry Film Adhesive," James Sampica et al.; and U.S. patent application No. 11/215,050, "Process For Applying A Protective Cover On An Organic Light-Emitting Diode Using A Liquid Adhesive," James Sampica et al.

FIELD OF THE INVENTION

The invention relates to panel-to-panel adhesion, and more particularly, to methods of manufacturing organic light-emitting diode displays.

BACKGROUND OF THE INVENTION

Organic light-emitting diodes (OLED) displays are light-emitting diodes that incorporate semiconducting organic polymers. OLEDs are beginning to be developed in large quantities and used in many different applications as OLED technology matures. However, because the organic materials used in OLED technology are sensitive to oxygen and humidity, these materials must be sealed to prevent penetration by air or water. One solution has been to adhere a capping or protective layer such as a semi-rigid substrate such as glass or plastic upon the OLED materials, and then sealing the edge of the combined OLED/glass assembly with a moisture-proof edge seal. Another solution has been to attach the semi-rigid substrate to the OLED materials using an application of adhesive applied to the outer perimeter of a face of the substrate. However, known processes do not provide an effective seal between the capping layer and the OLED materials. Known bonding processes often result in bubbles and defects in the adhesive interface or in the OLED layer itself. What is needed is a reliable method of adhering a protective layer to an OLED assembly.

It is therefore an object of the invention to provide such a reliable method of adhering a protective layer to an OLED assembly.

A feature of the invention is a controlled movement of a first panel, such as a protective layer, into contact with a second panel, such as an OLED assembly.

An advantage of the invention is the elimination of bubbles in the adhesive layer between the OLED and the protective layer.

SUMMARY OF THE INVENTION

The invention provides a method of adhering a first panel to a second panel. According to the method, an adhesive is applied to a face of at least one of the first and second panels. The first panel is positioned to be responsive to movement of any of a plurality of independently controlled expandable elements. The second panel is held adjacent to the first panel. At least one of the expandable elements is selectively expanded so that a first edge of the first panel contacts a first edge of the second panel. The expandable elements are further selectively expanded so that the adhesive fully contacts the first and second panels.

The invention also provides an apparatus for adhering a first substantially planar panel to a second substantially planar panel. The apparatus includes: means for applying an adhesive to a surface of at least one of the first and second panels; means for positioning the first panel to be responsive to movement of an expandable means; means for holding the second panel proximal to the first panel; and means for expanding the expandable means to sequentially bring a first region of the first panel in contact with a first region of the second panel, and bring a second region of the first panel in contact with a second region of the second panel.

The invention further provides an apparatus for adhering a protective cover plate to a display assembly. A surface of at least one of the protective cover plate and display assembly has an adhesive applied thereupon. The apparatus includes a fixture associated with one of the protective cover plate and the display assembly, the fixture including a plurality of expandable elements upon which said one of the protective cover plate and display assembly is situated. A holding implement holds the other of the protective cover plate and display assembly proximal said one of the protective cover plate and display assembly while at least some of the plurality of expandable elements are expanded to sequentially cause a first edge of the protective cover plate to contact the display assembly, and cause a second edge of the protective cover plate to contact the display assembly.

DETAILED DESCRIPTION OF THE DRAWINGS

Describing now the invention with reference to FIGS. 1-5, the invention provides a reliable method of bonding a first panel, such as a protective cover 12, to a second panel, such as an OLED assembly 14. It should be noted that the drawings are not necessarily drawn to scale, and that the dimensions of the various disclosed components have been drawn for the purposes of clarity in understanding the invention. Protective cover 12, which may also be called a capping layer, is made of substantially transparent glass or plastic. A transparent dry film adhesive 16 is applied to the protective cover and/or the OLED assembly, although in the disclosed embodiment the adhesive is applied to a substantial portion of a face 17 of protective cover 12. Preferably dry film adhesive 16 covers all or virtually all of face 17. Dry film adhesive 16 may be securely adhered to face 17 using a roller (not shown) or other suitable technique. An exemplary type of dry film adhesive is #9483 manufactured by 3M Corp. of Minneapolis, Minn., although other dry film adhesives may alternatively be used.

Figure 1:
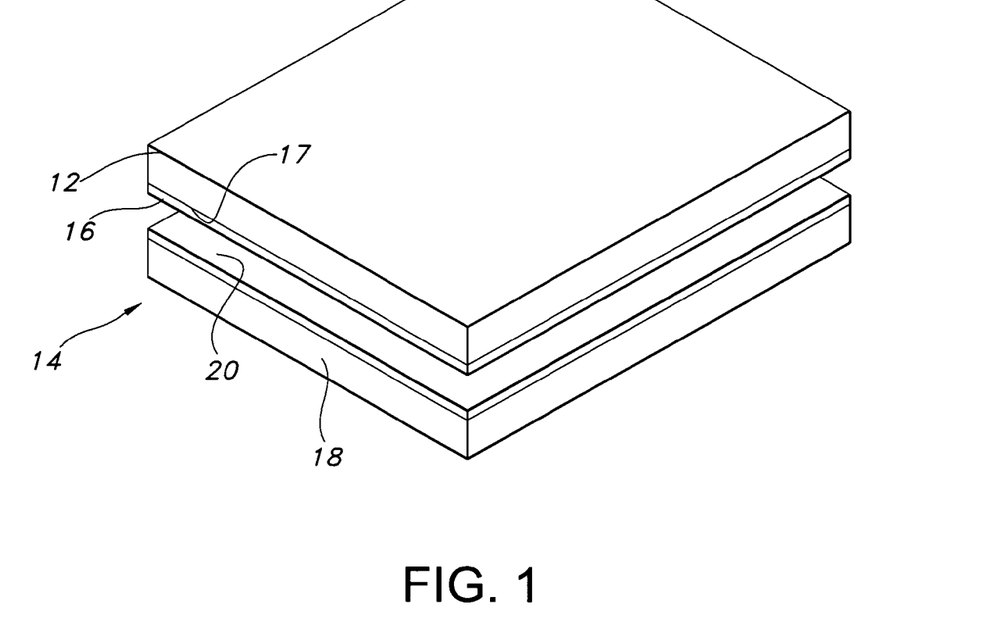
FIG. 1 is a perspective view of two panels according to the invention.

OLED assembly 14 includes a back pane or substrate 18, which may be plastic, glass, stainless steel, or other suitable material. OLED materials 20 are disposed upon substrate 18 using any suitable manufacturing method.

Figure 2:
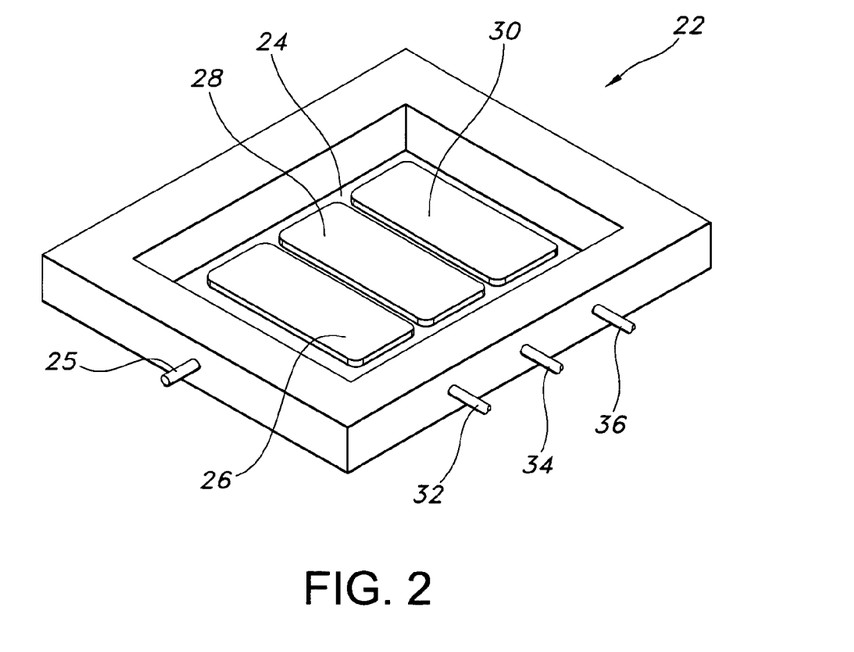
FIG. 2 is a perspective view of a fixture used with the invention.
Figure 3:
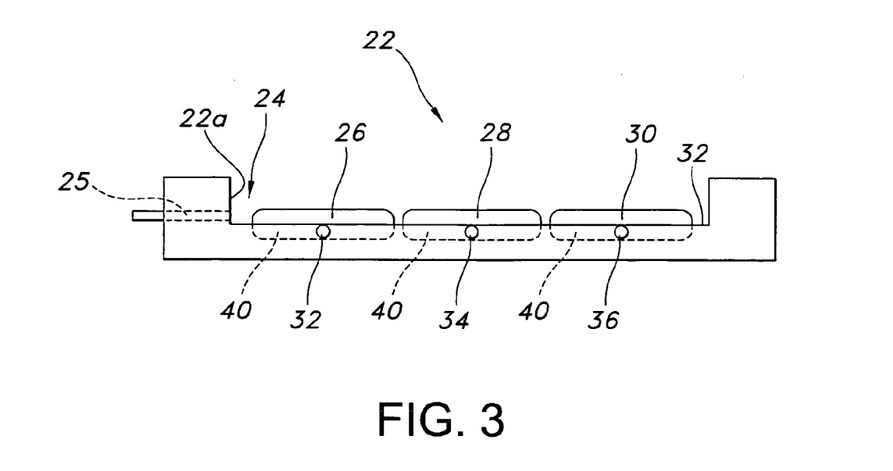
FIG. 3 is a side elevational view of the fixture of FIG. 2.
Figure 4:
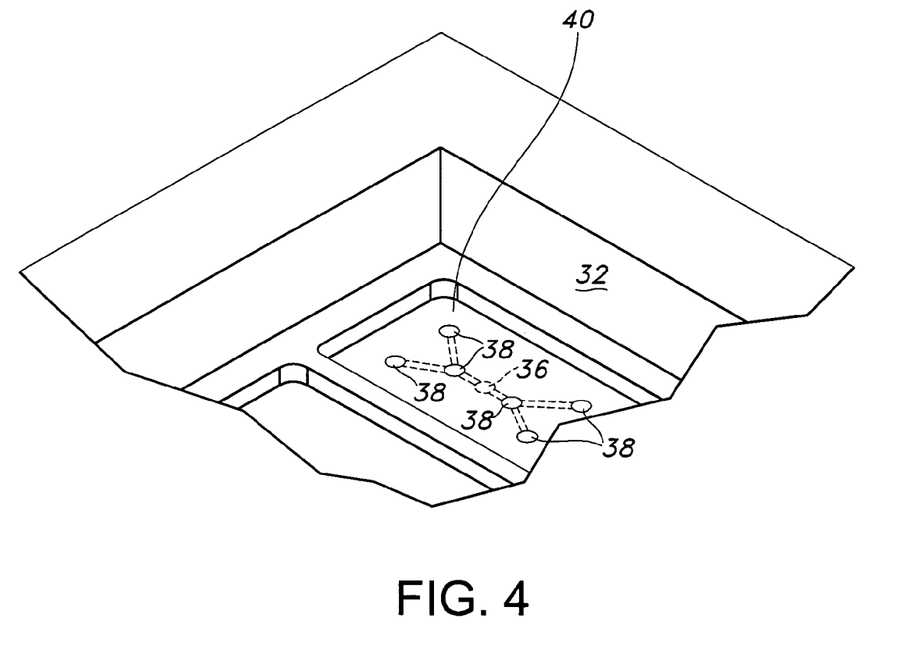
FIG. 4 is a detail view of FIG. 2.
Figure 5:
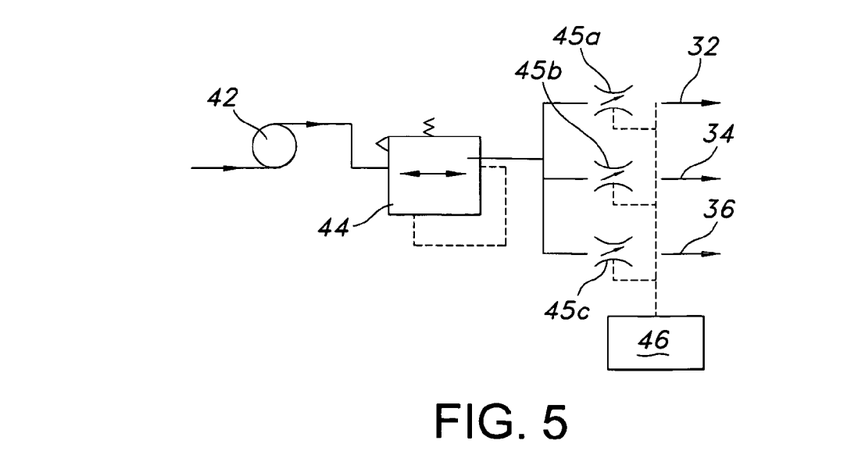
FIG. 5 is a schematic diagram of a control system according to an embodiment of the invention.

A manufacturing fixture that embodies concepts of the invention is depicted in FIG. 2 and is indicated generally by reference number 22. Fixture 22 includes a recessed portion or cavity 24 having dimensions at least as great as the OLED assembly and the protective cover. An air evacuation passage 25 is formed through a wall 22a of the fixture. Air evacuation passage 25 is connected to a vacuum pump or other apparatus (not shown) capable of reducing the air pressure within cavity 24 to below atmospheric pressure. A plurality of air-impermeable flexible, inflatable elements 26, 28, 30 or bladders are mounted upon the floor 32 of cavity 24. First, second and third air passages 32, 34, 36 extend into fixture 22 and, as shown in detail in FIG. 4, terminate underneath each flexible element. To evenly distribute airflow underneath each flexible element when each flexible element is activated, each air passage is connected to a plurality of air outlets 38 in a recessed portion 40 that is formed in floor 32 below each flexible element. A screen (not shown), preferably made of metal, can be bonded to recessed portion 40 to further optimize uniform distribution of airflow from the air passages. As schematically shown in FIG. 5, first, second and third air passages 32, 34, 36 are connected to a pressure source 42 through a pressure regulator 44. Flow control valves 45a, 45b, 45c are controlled by a controller 46 to selectively and independently control the flow of air into the first, second and third air passages. Each flexible element responds to changes in airflow rate by inflating or deflating, as will be described herein.

Figure 6:
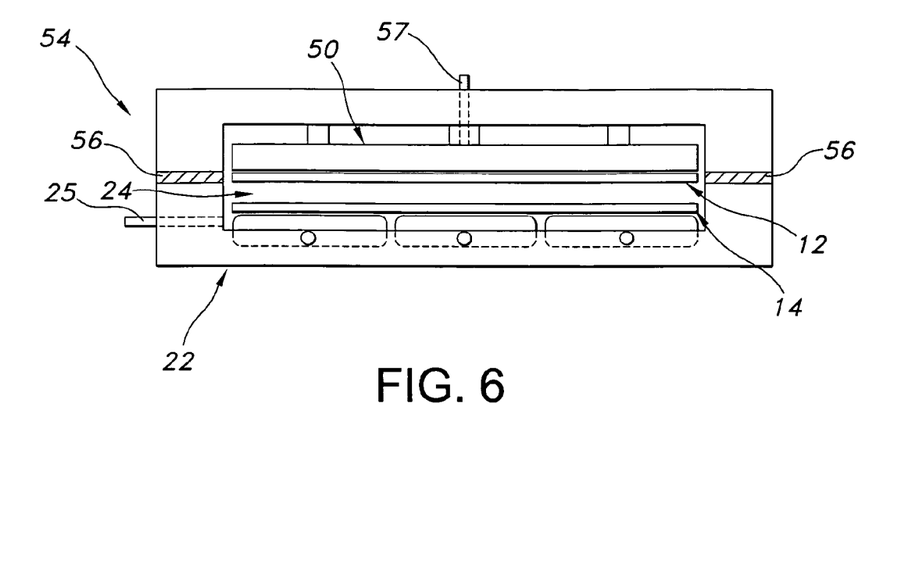
FIG. 6 is a side elevational view of the fixture of FIG. 2 during a manufacturing step according to the invention.
Figure 7:
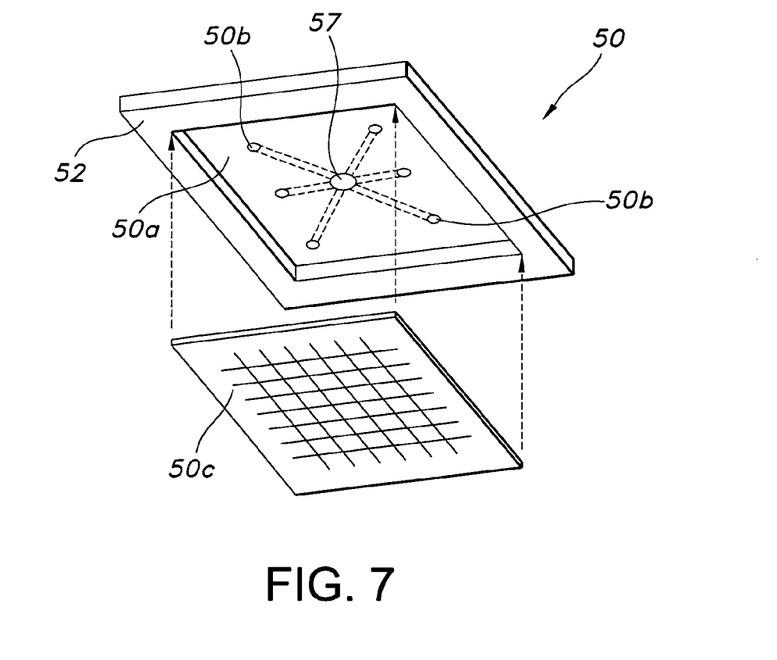
FIG. 7 is a perspective view of a portion of a manufacturing tool according to the invention.

FIGS. 6-9 depict a method of using fixture 22 to attach protective cover 12 to OLED assembly 14. One of the two panels, which in the disclosed embodiment is OLED assembly 14, is placed into cavity 24 so that the OLED assembly rests upon flexible elements 26, 28, 30. The other of the two panels, which in the disclosed embodiment is protective cover 12, is positioned above OLED assembly 14 using a source of vacuum pressure. In a preferred embodiment the source of vacuum pressure comprises a pressure plate or plenum 50. As shown in detail in FIG. 7, a recess 50a is formed in a substantially planar face 52 of plenum 50. A vacuum passage 57 connects a means for creating vacuum pressure, such as a vacuum pump (not shown), to a plurality of holes 50b within recess 50a. Holes 50b distribute the vacuum pressure throughout recess 50a and along face 52. To more evenly distribute the vacuum pressure along face 52, a screen 50c is placed upon recess 50a. As shown in FIG. 6, plenum 50 may be attached to a manufacturing tool 54 that encloses cavity 24 and isolates the cavity from atmospheric pressure. Cavity 24 may be further isolated by pressing the manufacturing tool against fixture 22 and/or positioning a sealing element 56, such as a silicone O-ring or the like, between fixture 22 and manufacturing tool 54.

Figure 8:
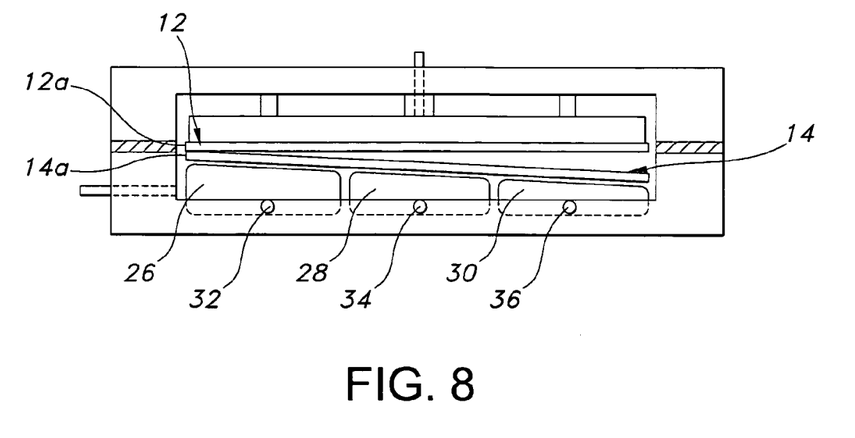
FIG. 8 is a side elevational view of the fixture of FIG. 2 during another manufacturing step according to the invention.
Figure 9:
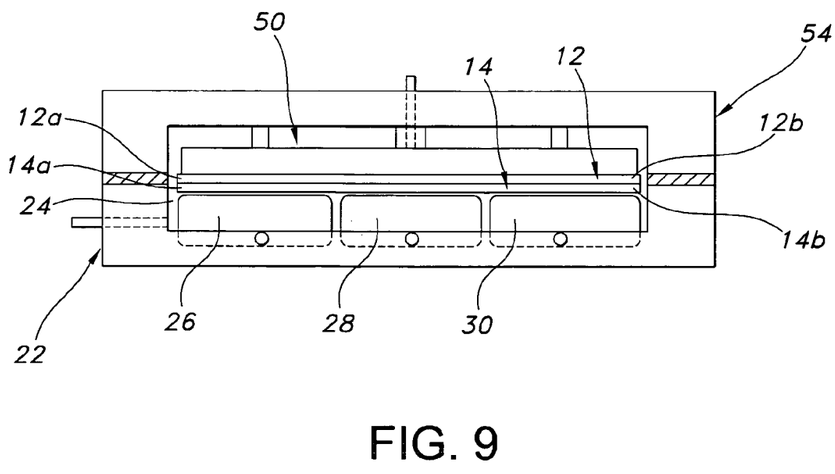
FIG. 9 is a side elevational view of the fixture of FIG. 2 during another manufacturing step according to the invention.

Once cavity 24 has been isolated from atmospheric pressure, air pressure within the cavity is evacuated or reduced through air evacuation passage 25 such that the air pressure within the cavity is substantially less than ambient air pressure. This is done to minimize the likelihood of gas entrapment during the remainder of the lamination process. To ensure protective cover 12 is maintained in place, the vacuum pressure exiting vacuum passage 57 must be greater than the pressure within the cavity. Air is selectively sent through flow control valves 45a, 45b, and 45c and through first, second and third air passages 32, 34, 36, respectively, to expand the flexible elements so that a first edge 14a of OLED assembly 14 contacts a first edge 12a of protective cover 12 (FIG. 8). This is accomplished by permitting more air to flow into flexible element 26 than into flexible elements 28 and 30. Such increased airflow causes flexible element 26 to expand or inflate more than the remaining flexible elements, thereby lifting first edge 14a higher than the remainder of the OLED assembly. Once first edge 12a of the protective cover and first edge 14a of the OLED assembly contact each other, airflow is gradually increased into flexible elements 28 and 30 so that a second edge 14b of OLED assembly 14 contacts a second edge 12b of protective cover 12, as shown in FIG. 9. The OLED assembly and protective cover are held between flexible elements 26, 28, 30 and plenum 50 until defects in the adhesive are minimized. Such further conditioning of the adhesive may involve subjecting the bonded OLED assembly and protective cover to an increase in temperature (up to about 95 degrees C.) and/or pressure (up to about 95 PSIG applied by the flexible elements) for a predetermined time. Air pressure within cavity 24 is returned to normal, manufacturing tool 54 is removed from fixture 22, and the bonded OLED assembly and protective cover may be removed from fixture 22. Flexible elements 26, 28, 30 are deflated by removing air pressure therefrom, and the fixture is ready to be used again.

Figure 10:
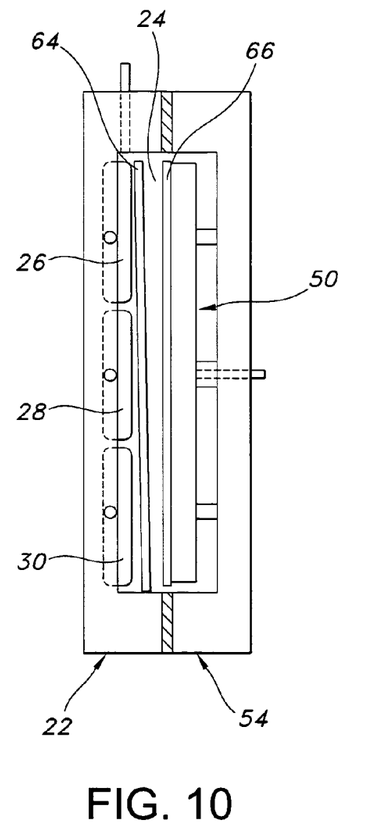
FIG. 10 is a side elevational view of a fixture according to still another embodiment of the invention.
Figure 11:
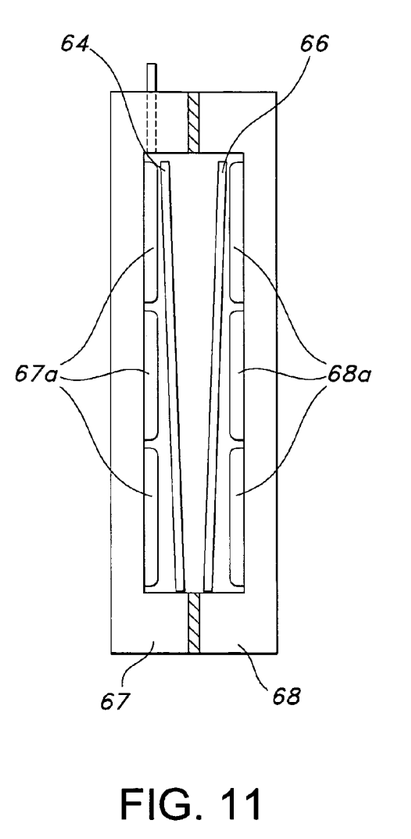
FIG. 11 is a side elevational view according to yet another embodiment of the invention.

The invention as disclosed thus far has assumed the fixture remains horizontally disposed while the two panels are adhered together. FIG. 10 shows another embodiment of the invention in which fixture 22 and tool 54 are vertically disposed. A first panel 64 is placed within cavity 24 in a vertical position such that the first panel leans or is inclined against flexible elements 26, 28, 30. Plenum 50 holds a second panel 66 in a corresponding vertical position. The first and second panels are brought together as previously described. FIG. 11 shows another embodiment of the invention in which first and second panels 64, 66 are vertically disposed but slightly inclined in separate fixtures 67, 68. After evacuating the air between the fixtures as previously described, inflatable elements 67a, 68a in each fixture are expanded as desired to bring the first and second panels together as desired.

Figure 12:
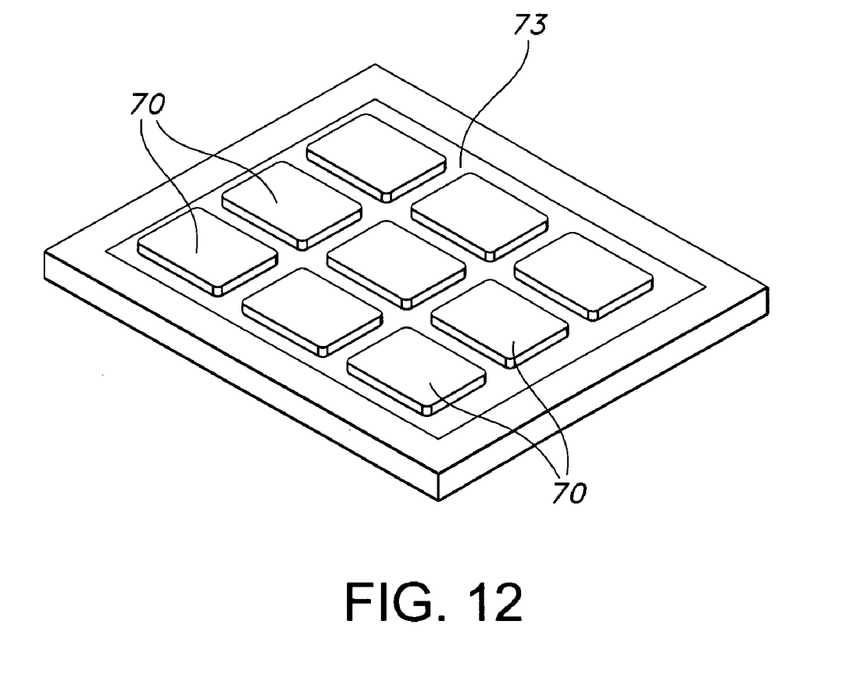
FIG. 12 is a perspective view of a fixture according to another embodiment of the invention.

Previous figures show a fixture having three flexible, inflatable elements, arranged in parallel in a row upon a floor of the fixture, where the elements selectively move one panel toward another panel. In some cases two independently inflatable elements may be adequate to join the two panels together. The invention may be further varied by using four, five, or even more independently inflatable elements as desired. FIG. 12 shows another embodiment of the invention in which inflatable elements 70 are arranged in a grid pattern upon a surface 73 of a fixture 74. The inflation of inflatable elements 70 may be independently controlled, or alternatively a certain subset or subsets of the inflatable elements may be controlled together. Such a grid pattern permits greater control of the movement of a panel placed thereupon.

Figure 13:
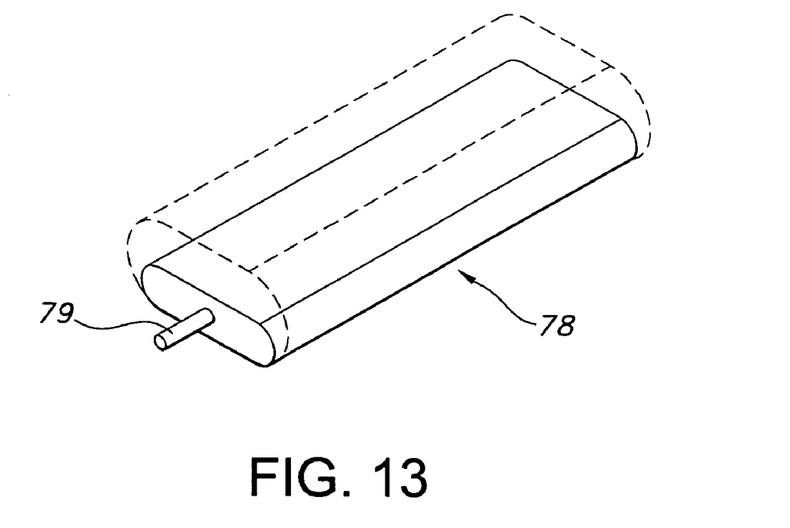
FIG. 13 is a perspective view of an expandable element according to another embodiment of the invention.

FIG. 13 shows another type of flexible element that may be used with the invention. Instead of being permanently fastened or embedded in the floor of a manufacturing fixture, bladder 78 defines a completely enclosed inflatable volume with an air passage 79 connected to an air source as previously described and shown in FIG. 5. Any number or shape of bladders 78 may be used as desired. Other types, shapes, patterns and arrangements of independently inflatable elements may be implemented and are within the scope of the invention.

Figure 14:
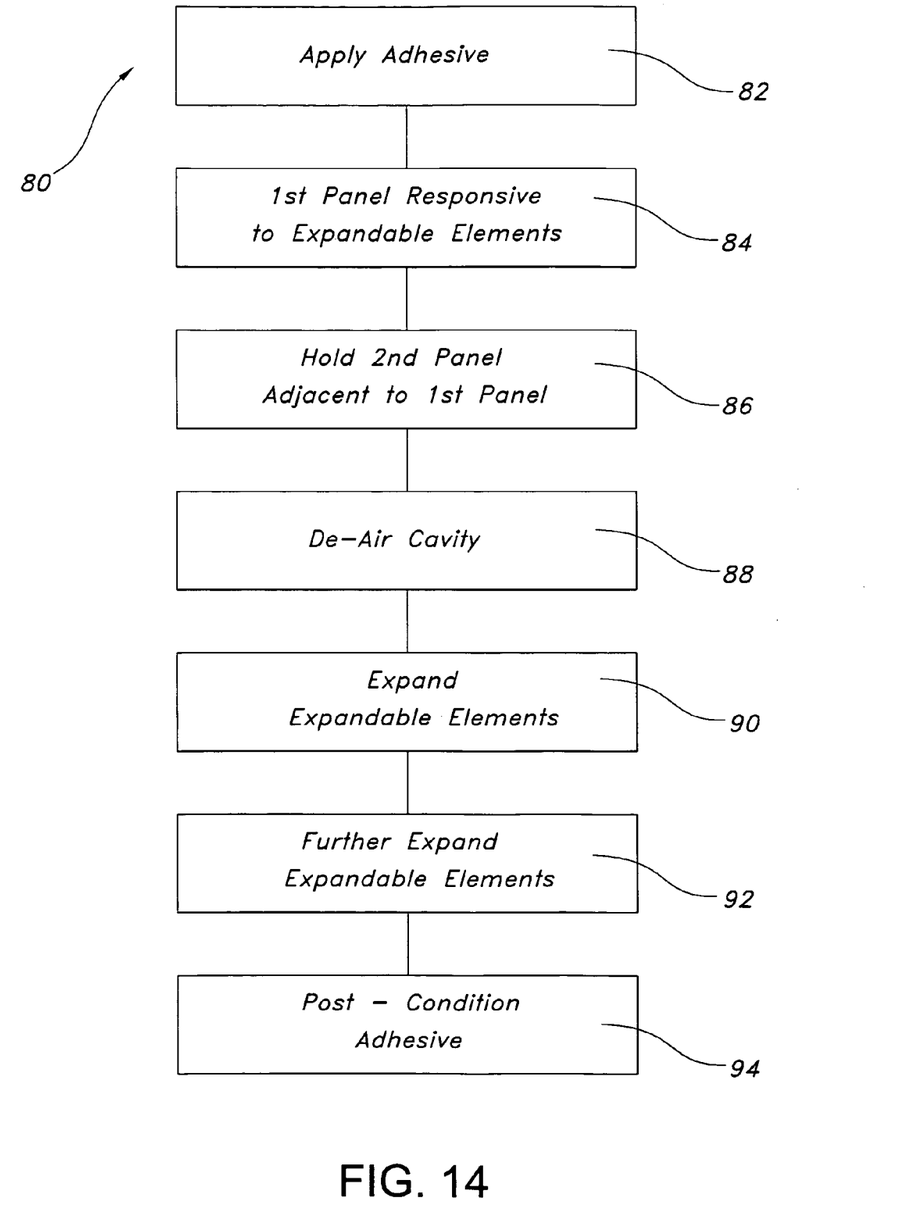
FIG. 14 is a flowchart of a method according to the invention.

FIG. 14 shows a method 80 of adhering first and second panels together according to the invention. In step 82 an adhesive is applied to a face of at least one of the two panels. In step 84 the first panel is positioned to be responsive to movement of any of a plurality of independently controlled expandable elements. In step 86 the second panel is held adjacent the first panel. In step 88 air around the first and second panels is de-aired or evacuated. In the case where the first and second panels are placed in a cavity of a manufacturing fixture, the cavity may be sealed and then de-aired. In step 90 the expandable elements are selectively activated or expanded so that a first edge of the first panel contacts a first edge of the second panel. In step 92 the expandable elements are further selectively activated or expanded so that the adhesive fully contacts the first and second panels. In step 94 the adhesive is subjected to further conditioning steps as desired. The order in which the steps in method 80 are performed may be varied while keeping within the spirit of the invention.

The invention has been described in detail as a method of bonding a protective cover to an OLED assembly. It should be clear, however, that the invented method may also be used to bond any two panels or substrates together. Furthermore, many different dry film adhesives may be used with the invention.

The invention as disclosed provides a reliable method of adhering together two panels or substrates. The invention has particular utility in adhering a plastic or glass protective layer to an OLED assembly.

An advantage of the invention is that independent actuation and expansion of the flexible elements permits the adhesion of a first panel to a second panel to be performed in a precisely controlled manner.

Another advantage of the invention is the elimination of bubbles in the adhesive layer between the OLED and the protective layer.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of adhering a first panel to a second panel, comprising:
    applying an adhesive to a face of at least one of the first and second panels;
    positioning the first panel to be responsive to movement of any of a plurality of independently controlled expandable elements;
    holding the second panel adjacent to the first panel;
    selectively expanding at least one of the expandable elements so that a first edge of the first panel contacts a first edge of the second panel; and
    further selectively expanding the expandable elements so that the adhesive fully contacts the first and second panels.

2. The method of claim 1, wherein said at least one of the expandable elements includes expandable elements proximal to the first edge of the first panel.

3. The method of claim 1, wherein the expandable elements comprise independently inflatable flexible bladders.

4. The method of claim 1, wherein the first panel is substantially horizontally positioned when the second panel is held adjacent to the first panel.

5. The method of claim 4, wherein the second panel is positioned above the first panel while the expandable elements are expanded.

6. The method of claim 1, wherein the first panel is substantially vertically oriented when the second panel is held adjacent to the first panel.

7. The method of claim 1, wherein the first panel is placed in contact with the plurality of expandable elements.

8. The method of claim 1, further comprising evacuating air pressure adjacent to the first and second panels prior to expanding the expandable elements.

9. The method of claim 1, wherein the plurality of expandable elements includes a first group of expandable elements adjacent to the first edge of the first panel, and a second group of expandable elements adjacent to the second edge of the first panel.

10. An apparatus for adhering a first substantially planar panel to a second substantially planar panel, comprising:
    means for applying an adhesive to a surface of at least one of the first and second panels;
    means for positioning the first panel to be responsive to movement of an expandable means;
    means for holding the second panel proximal to the first panel; and
    means for expanding the expandable means to sequentially bring a first region of the first panel in contact with a first region of the second panel, and
        bring a second region of the first panel in contact with a second region of the second panel.

11. The apparatus of claim 10, wherein the means for holding positions the second panel above the first panel while the expandable means are expanded.

12. The apparatus of claim 10, wherein the expandable means comprises a plurality of independently expandable elements.

13. The apparatus of claim 10, wherein the expandable means comprises a first expandable element adjacent to the first region of the first panel, and a second expandable element adjacent to the second region of the first panel, said second expandable element being inflatable independent of the first expandable element.

14. The apparatus of claim 10, wherein the expandable means comprises:
- a first group of expandable elements adjacent to the first region of the first panel; and
- a second group of expandable elements adjacent to the second region of the first panel;
- wherein the first and second groups of expandable elements are controlled to be independently inflatable from each other.

15. An apparatus for adhering a protective cover plate to a display assembly, a surface of at least one of the protective cover plate and display assembly having an adhesive applied thereupon, the apparatus comprising:
- a fixture associated with one of the protective cover plate and the display assembly, the fixture including a plurality of expandable elements upon which said one of the protective cover plate and display assembly is situated;
- a holding implement that holds the other of the protective cover plate and display assembly proximal to said one of the protective cover plate and display assembly while at least some of the plurality of expandable elements are expanded to sequentially
  - cause a first edge of the protective cover plate to contact the display assembly, and
  - cause a second edge of the protective cover plate to contact the display assembly.

16. The apparatus of claim 15, wherein the plurality of expandable elements are disposed within a cavity of the fixture.

17. The apparatus of claim 15, wherein the plurality of expandable elements are disposed in parallel rows upon the fixture.

18. The apparatus of claim 15, wherein the holding implement uses vacuum pressure to hold said other of the protective cover plate and display assembly proximal to said one of the protective cover plate and display assembly.

19. The apparatus of claim 15, further comprising an airflow control system that independently controls an airflow to each of the plurality of expandable elements.

20. The apparatus of claim 15, wherein the display assembly is an organic light-emitting diode (OLED) assembly.

* * * * *